United States Patent [19]

Jödden et al.

[11] 4,355,010

[45] Oct. 19, 1982

[54] PROCESS FOR REMOVING PHOSPHORUS IN VAPOR FORM AND PHOSPHANES FROM GAS MIXTURES

[75] Inventors: Klaus Jödden; Friedrich-Wilhelm Dorn, both of Hürth; Gero Heymer, Erftstadt; Hans-Werner Stephan, Cologne, all of Fed. Rep. of Germany

[73] Assignee: Hoechst Aktiengesellschaft, Fed. Rep. of Germany

[21] Appl. No.: 201,761

[22] Filed: Oct. 29, 1980

[30] Foreign Application Priority Data

Nov. 2, 1979 [DE] Fed. Rep. of Germany ....... 2944288

[51] Int. Cl.³ ................... B01D 53/34; C01B 25/12
[52] U.S. Cl. ................... 423/210; 423/304; 423/317
[58] Field of Search ............ 423/210 R, 304, 317

[56] References Cited

U.S. PATENT DOCUMENTS 4,175,111  11/1979  Munday et al. .............. 423/210
4,185,079  1/1980   Munday et al. .............. 423/210 R Primary Examiner—O. R. Vertiz
Assistant Examiner—Wayne A. Langel
Attorney, Agent, or Firm—Connolly and Hutz

[57] ABSTRACT

Phosphorus in vapor form and phosphanes are separated from gas mixtures which consist of carbon monoxide, with or without hydrogen, nitrogen and steam. Concerned are more particularly the off-gases of phosphorus-producing furnaces. To this end, the gas mixture is admixed with at least the stoichiometric amount of oxygen and/or of oxygen-containing gases necessary to achieve conversion of the total phosphorus contained in the gas mixture to oxidation level V. The resulting mixture is introduced into a reaction zone maintained at a temperature within the range 200° to 700° C. and allowed to remain therein over a period of 0.5 to 20 seconds. Resulting phosphorus-V compounds are finally separated from the gas mixture.

4 Claims, 1 Drawing Figure

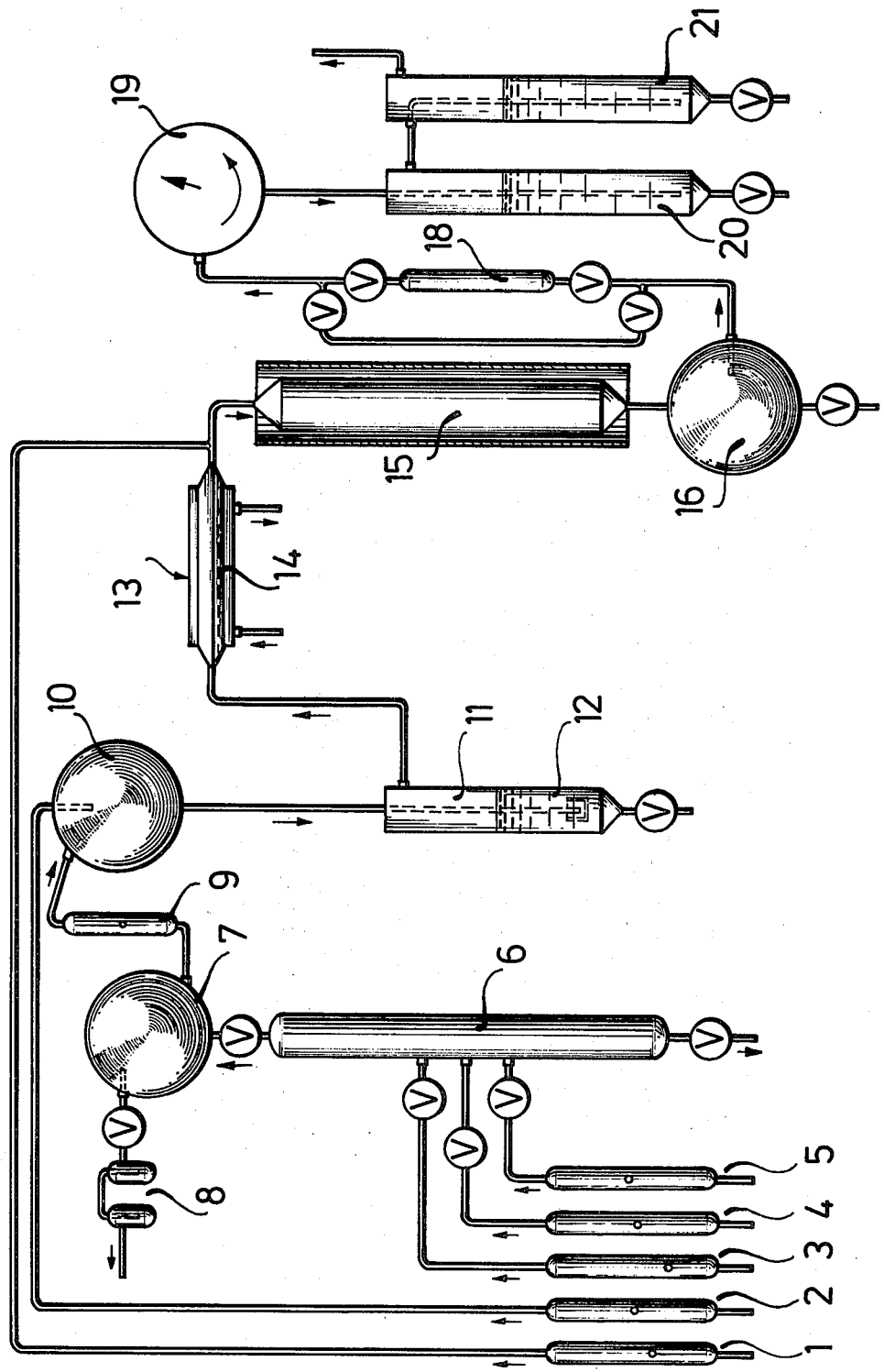

PROCESS FOR REMOVING PHOSPHORUS IN VAPOR FORM AND PHOSPHANES FROM GAS MIXTURES

The present invention relates to a process for removing phosphanes and phosphorus in vapor form from gas mixtures which consist of carbon monoxide, with or without hydrogen, nitrogen and steam, and more particularly from off-gases of thermal phosphorus-producing furnaces.

In the production of phosphorus from crude phosphates in the presence of coke quartz gravel, either in an electrothermal reduction furnace or in a blast furnace, the material which is produced first is a gas mixture consisting of phosphorus in vapor form and carbon monoxide as the main constituents, with small proportions of hydrogen, nitrogen, steam and phosphanes.

In a first processing stage, the gas mixture is freed from the bulk of phosphorus in vapor form by condensation with the use of circulated water as the coolant. At a temperature of the coolant of about 55° to 70° C., the issuing gas still contains about 3 to 5 g/m$^3$ of phosphorus in vapor form (German Patent No. 634,949). Next, the gas is cooled to 10° C. by injection of cold water, for example at 5° C. After this has been done, the gas still contains about 0.06 g/m$^3$ of phosphorus in vapor form (German Patent No. 1,048,885). The gas so treated of which about 90% is carbon monoxide still contains about 1 g/m$^3$ of phosphanes. Because of its content of phosphorus components, it is not possible for this gas so rich in energy to be used as a fuel gas. The reason for this resides in the fact that its combustion involves the formation of phosphorus acids which are liable to corrode low alloyed steels which are customarily used for making the boiler.

To remove phosphine from the off-gases of electrothermal phosphorus-producing furnaces after condensation of the phosphorus, German Offenlegungsschrift No. 2,854,086 provides for these off-gases to be heated for a sufficiently long period to temperatures of 700°–800° C. with decomposition of the phosphine to red phosphorus and hydrogen. The red phosphorus is partially separated, as such, from the gas, and partially converted to phosphoric acid by treating the gas with soluble peroxides, the phosphoric acid being removed from the gas by scrubbing. Though no specific mention is made in this Offenlegungsschrift of the phosphorus in vapor form still contained in these off-gases, it can nevertheless be assumed that the phosphorus in vapor form originally contained in this gas is also converted to red phosphorus on subjecting the gas to the cooling treatment described therein.

The process described in German Offenlegungsschrift No. 2,854,086 suffers from the disadvantage that it is necessary for a small amount of a solid substance, namely red phosphorus, to be removed from large volumes of gas, which is difficult to achieve. The method proposed in the above Offenlegungsschrift for removing the red phosphorus carried along with the off-gases, namely oxidation by means of aqueous peroxide solution to give phosphoric acid, and separation of the latter from the gases, is very expensive.

The present invention now provides a process for removing the phosphorus components from gases, especially from off-gases of thermal phosphorus-producing furnaces, wherein the phosphorus in vapor form and phosphorus-containing compounds are completely converted to phosphorus reaction products which are easy to remove from the gases.

To this end, the invention provides for the gas mixture to be admixed with at least the stoichiometric proportion of oxygen and/or an oxygen-containing gas necessary to achieve conversion of the total phosphorus present in the gas mixture to oxidation level V, for the resulting mixture to be introduced into a reaction zone maintained at a temperature within the range 200° to 700° C., and for the mixture to remain therein over a period of 0.5 to 20 seconds, and for resulting phosphorus-V compounds to be separated from the gas mixture.

Preferred features of the present invention provide:

(a) for the mixture to be introduced into a reaction zone maintained at a temperature of 400° to 600° C.;

(b) for the mixture to remain in the reaction zone over a period of 3 to 8 seconds;

(c) for the temperature in the reaction zone to be maintained by subjecting a portion of the carbon monoxide forming part of the mixture to combustion;

(d) for the phosphorus-V compounds to be separated from the gas mixture by subjecting this latter to scrubbing treatment;

(e) for the scrubbing treatment to be effected with phosphoric acid;

(f) for the scrubbing treatment to be effected with alkaline solutions; and (g) for sodium hydroxide solution to be used as the alkaline solution.

Though phosphanes are known to be self-ignitible, they are virtually not oxidized by oxygen-containing gases provided that they are present in low concentration in a gas mixture. In that case complete oxidation, according to the invention, only occurs if the gas mixture, admixed with oxygen, is exposed to a sufficiently high temperature for an adequate period of time. Thus, for example, it is necessary for a gas mixture which has a PH$_3$ content of 1.1 g/m$^3$ and is admixed with an amount of air equal to a five-fold excess of oxygen relative to the phosphorus oxidation level V, to remain for about 3 seconds in the reaction zone at 500° C. so as to reduce the PH$_3$ content to less than 0.15 mg/m$^3$ (limit of detection of PH$_3$ testing tubes from Messrs. Drägerwerk, Lübeck).

These are the conditions which also ensure the oxidation of any phosphorus in vapor form which may be present in the gas mixture.

Under the conditions of the present process phosphanes are converted to phosphoric acid or polyphosphoric acid, whilst phosphorus in vapor form is oxidized to form a P$_4$O$_{10}$ mist. By subjecting the gas leaving the reaction zone to an acid or alkaline scrubbing treatment, it is possible to separate P$_4$O$_{10}$ mist and acid droplets.

An advantageous embodiment of the process of this invention, provides for a partial stream of the gas mixture to be subjected to combustion with an amount of air which corresponds to its stoichiometric carbon monoxide/oxygen ratio, and for said partial stream to be then combined with the bulk of the gas mixture, which is just admixed with at least the stoichiometric proportion of oxygen necessary for the oxidation of the phosphorus components therein so as to produce the temperature required in the reaction zone.

The present process permits an enery-rich fuel gas (calorific value about 11,000 kJ/m$^3$), which is free from substances corroding steels, to be prepared in simple manner, especially from off-gases of thermal phosphorus-producing furnaces.

EXAMPLE 1

(Invention)

A gas mixture containing carbon monoxide together, inter alia, with monophosphane and phosphorus in vapor form, was produced by means of an apparatus as shown in the accompanying drawing. Next, the gas mixture was treated as described in this invention. A fuel gas which was substantially free from corrosive compounds was obtained.

With reference to the drawing:

The apparatus was comprised of five flowmeters (1, 2, 3, 4 and 5). Carbon monoxide, monophosphane and hydrogen sulfide respectively travelled through the flowmeters (3, 4 and 5), and then entered a mixing column 6, from which they were introduced into a first mixing bulb 7. The mixing bulb 7 was connected to a bubbler 8 and a second mixing bulb 10, into which further carbon monoxide coming from flowmeter 2 was introduced and mixed with the $CO-PH_3-H_2S$ mixture. From the mixing bulb 10, the gas mixture flowed through a bubbler vessel 11 charged with water 12 (at 25° to 30° C.). The gas mixture loaded with steam was finally passed through a jacketed melting tube 13, heated with warm water, and containing liquid phosphorus 14 (at about 60° C.). Next, oxygen was passed through a line connected to the flowmeter 1, into the gas mixture which at that stage consisted of carbon monoxide, monophosphane, hydrogen sulfide, steam and phosphorus in vapor form, and the total mixture was introduced into a heated reactor 15. The gas issuing from the reactor 15 passed through a hold-up bulb 16 and was then either trapped in a gas absorption tube 18 or travelled via a gasmeter 19 through two successive scrubbing towers (20, 21), each of which was filled with sodium hydroxide solution.

Summarized in the following Table are the essential parameters of four experiments. In this Table the various symbols have the following meanings.

T temperature of the reactor 15 (° C.)
V (CO) volume of CO metered via the flowmeters 2 and 3 (l/h)
V ($O_2$) volume of $O_2$ metered via the flowmeter 1 (l/h)
$PH_3$ monophosphane content of the gas mixture fed to the reactor 15 (g/m³)
$P_4$ phosphorus in vapor form present in the gas mixture fed to the reactor 15 (g/m³)
$H_2O$ steam content of the gas mixture fed to the reactor 15 (g/m³)
$H_2S$ hydrogen sulfide content of the gas mixture fed to the reactor 15 (g/m³)
t residence time of the gas mixture in the reactor 15 (s)
residual $PH_3$ monophosphane contained in the gas issuing from the second scrubbing tower 21 (mg/m³)
residual $P_4O_{10}$ $P_4O_{10}$ washed out in the second scrubbing tower 21 (mg/m³) (bulk of $P_4O_{10}$ mist is washed out in the first scrubbing tower 20.)

The residual $PH_3$ was determined by means of gas testing tubes from Messrs. Drägerwerk, Lübeck, and the residual $P_4O_{10}$ was determined photometrically by the phosphorus/molybdenum blue method (compare C. H. Fiske and Y. Subbarow: J. Biol. Chem. 66 (1925) 375–400).

EXAMPLE 2

(Comparative experiment)

A gas mixture which contained 96% by volume of carbon monoxide and 3% by volume of steam together with 1.5 g/m³ of monophosphane, 0.3 g/m³ of phosphorus in vapor form and 2.2 g/m³ of hydrogen sulfide was mixed with oxygen (0.06 part by volume of oxygen per part by volume of gas mixture) and ignited. The ignited mixture was fed to the unheated reactor 15 according to Example 1, and had a temperature of 100° C. at the reactor inlet. At the reactor inlet, a further 0.03 part by volume of oxygen per part by volume of mixture was added to the mixture. The gas leaving the reactor was at a temperature of 50° C. and still contained 0.7 g/m³ of monophosphane (determined by means of gas testing tubes from Messrs. Drägerwerk, Lübeck).

EXAMPLE 3

(Invention)

Off-gas coming from an electrothermal phosphorus-producing furnace, from which phosphorus had been condensed out in two stages, according to German Pat. No. 1,048,885 (warm condensation and cold condensation), had the following composition:

| | |
|---|---|
| CO | 88 % |
| $H_2$ | 5 % |
| $CH_4$ | 1 % |
| $CO_2$ | 1 % |
| $P_4$ | 0.2 % |
| $PH_3$ | 0.1 % |
| $H_2O$ | 2.5 % |
| $N_2$ | balance |

This off-gas was mixed with air (0.1 part by volume of air/part by volume of off-gas) and was led through a reactor heated to 590° C. by means of foreign energy, the residence time in the reactor being 6.5 s. The off-gas leaving the reactor was led through two successive scrubbing towers charged with 2% strength sodium hydroxide solution. The gas leaving the second scrubbing tower had a $PH_3$ content of <0.15 mg/m³; $P_4O_{10}$ was not detectable in this gas (the determinations were carried out as in Example 1).

EXAMPLE 4

(Invention)

Off-gas coming from an electrothermal phosphorus-producing furnace and having the same composition as in Example 3 was mixed with oxygen (0.02 part by volume of oxygen/part by volume of off-gas) and was

| T | V(CO) | V($O_2$) | $PH_3$ | $P_4$ | $H_2O$ | $H_2S$ | t | Residual $PH_3$ | Residual $P_4O_{10}$ |
|---|---|---|---|---|---|---|---|---|---|
| 450 | 225 | 8 | 2.3 | — | 18.6 | 2.2 | 8.3 | 80 | — |
| 500 | 180 | 5 | 1.5 | 0.3 | 18.6 | 2.2 | 7.7 | <0.15 | 14 |
| 500 | 510 | 15 | 1.6 | 0.3 | 18.6 | 2.2 | 2.6 | <0.15 | 40 |
| 500 | 770 | 24 | 1.8 | — | 18.6 | 2.2 | 1.7 | 10 | — | led through a reactor heated to 500° C. by means of foreign energy, the residence time in the reactor being 8 s. The off-gas leaving the reactor was passed through two successive Venturi scrubbers, charged with 5% strength phosphoric acid, to remove phosphoric acid droplets and $P_4O_{10}$ mist. The gas leaving the second scrubbing tower had a $PH_3$ content of $<0.15$ mg/m$^3$; $P_4O_{10}$ was not detectable therein (the determinations were carried out as in Example 1).

EXAMPLE 5

(Invention)

Off-gas coming from an electrothermal phosphorus-producing furnace and having the same composition as in Example 3 was mixed with oxygen (0.03 part by volume of oxygen/part by volume of off-gas) and was led through a reactor heated to 200° C., the residence time in the reactor being 7.6 s. The off-gas leaving the reactor was passed through two succesive Venturi washers, charged with 5% strength phosphoric acid, to remove phosphoric acid droplets and $P_4O_{10}$ mist. The gas leaving the second wash tower had a $PH_3$ content of 0.13 g/m$^3$; $P_4O_{10}$ was not detectable therein (the determinations were carried out as in Example 1).

EXAMPLE 6

(Invention)

Off-gas coming from an electrothermal phosphorus-producing furnace and having the composition given in Example 3 was mixed with air in an amount sufficient for the stoichiometric oxidation of the carbon monoxide, hydrogen and methane contained therein (2.2 parts by volume of air/parts by volume of off-gas).

This off-gas/air mixture was ignited and the hot combustion gas, together with an air/off-gas mixture (0.1 part by volume of air/part by volume of off-gas) was passed through an insulated reactor, the volume ratio of combustion gas: air/off-gas mixture being 0.24:1 and the residence time in the reactor being 5 s. At the end of the reactor, the gas was at a temperature of 460° C. It was passed through two scrubbing towers charged with 3% strength sodium hydroxide solution. The gas leaving the second scrubbing tower had a $PH_3$ content of 0.3 mg/m$^3$; $P_4O_{10}$ was not detectable therein (the determinations were carried out as in Example 1).

We claim:

1. In a process for removing phosphorus vapor and one or more phosphines from carbon monoxide-containing off-gas generated in the furnace production of elemental phosphorus by oxidizing with at least a stoichiometric amount of oxygen or an oxygen - containing gas necessary to achieve conversion of the total phosphorus present to oxidation stage V, for 0.5–20 seconds in a reaction zone heated to 200°–700° C., the improvement which comprises:

scrubbing the oxidized off-gas with an aqueous alkaline solution to separate the resulting phosphorus-V compounds from the oxidized off-gas.

2. A process according to claim 1 wherein the phosphorus vapor content of the off-gas has been reduced to not more than about 0.3 g/m$^3$, but not below 0.06 g/m$^3$, with a double-stage condensation.

3. In a process for removing phosphorus in vapor form and phosphines from off-gas generated in the furnace production of elemental phosphorus, said off-gas, which is a gas mixture freed from the bulk of phosphorus by double stage condensation and contains about 90% carbon monoxide, about 0.06 g/m$^3$ phosphorus in vapor form and about 1 g/m$^3$ of phosphines, having been subjected to the steps comprising:

(a) introducing an amount of oxygen or an oxygen-containing gas, respectively, into the gas mixture sufficient to oxidize the total phosphorus present in said gas mixture to oxidation stage V, (b) introducing the gas mixture from step (a) into a reaction zone maintained at a temperature within the range 200° to 700° C., (c) allowing the mixture to remain therein over a period of 0.5 to 20 seconds, and (d) separating resulting phosphorus-V-compounds from the gas mixture by scrubbing it with an aqueous solution; the improvement wherein the scrubbing is effected with an alkaline solution.

4. The process as claimed in claim 3 or 1 wherein sodium hydroxide solution is used as the alkaline solution.

* * * * *